US008806466B2

(12) United States Patent
Tanaka et al.

(10) Patent No.: US 8,806,466 B2
(45) Date of Patent: Aug. 12, 2014

(54) PROGRAM GENERATION DEVICE, PROGRAM PRODUCTION METHOD, AND PROGRAM

(75) Inventors: Akira Tanaka, Osaka (JP); Hiroyuki Morishita, Osaka (JP); Akihiko Inoue, Osaka (JP)

(73) Assignee: Panasonic Corporation, Osaka (JP)

( * ) Notice: Subject to any disclaimer, the term of this patent is extended or adjusted under 35 U.S.C. 154(b) by 89 days.

(21) Appl. No.: 13/393,992

(22) PCT Filed: Jul. 4, 2011

(86) PCT No.: PCT/JP2011/003812
§ 371 (c)(1),
(2), (4) Date: Mar. 2, 2012

(87) PCT Pub. No.: WO2012/004972
PCT Pub. Date: Jan. 12, 2012

(65) Prior Publication Data
US 2012/0167036 A1 Jun. 28, 2012

(30) Foreign Application Priority Data
Jul. 5, 2010 (JP) .................................. 2010-153325

(51) Int. Cl.
*G06F 9/45* (2006.01)
(52) U.S. Cl.
CPC .............. *G06F 8/452* (2013.01); *G06F 8/456* (2013.01)
USPC ............ 717/160; 717/149; 717/150; 717/161
(58) Field of Classification Search
None
See application file for complete search history.

(56) References Cited

U.S. PATENT DOCUMENTS 5,067,068 A * 11/1991 Iwasawa et al. .............. 717/160
(Continued)

FOREIGN PATENT DOCUMENTS

| JP | 63-304325 | 12/1988 |
| JP | 3028821 | 4/2000 |
| JP | 3234552 | 12/2001 |

OTHER PUBLICATIONS

O'Neil et al., Using Unfolding to Minimize Inter-Iteration Dependencies, Nov. 2009, Proceedings of the 16th IASTED International Conference, Parallel and Distributed Computing and Systems, pp. 342-347.*
International Search Report issued Aug. 2, 2011 in International (PCT) Application No. PCT/JP2011/003812.

(Continued)

*Primary Examiner* — Lewis A Bullock, Jr.
*Assistant Examiner* — Melissa Alfred
(74) *Attorney, Agent, or Firm* — Wenderoth, Lind & Ponack, L.L.P.

(57) ABSTRACT

A program generation apparatus references a source program including a loop for executing a block N times (N≥2) and having such dependence that a variable defined in a statement in the block pertaining to $i^{th}$ execution (1≤i<N) is referenced by a statement in the block pertaining to $j^{th}$ execution (i<j≤N), calculates equivalent representations of variables in the block pertaining to the $i^{th}$ execution and the block pertaining to any other execution than the $i^{th}$ execution, specifies, with respect to each representation of a target variable causing the dependence, a representation of a variable not causing the dependence that is equivalent to the representation of the target variable, and generates a program being for executing the block M times (M≤N) and including a statement including the specified representation in place of each representation of the target variable.

7 Claims, 20 Drawing Sheets

(56) References Cited

U.S. PATENT DOCUMENTS

| | | | | |
|---|---|---|---|---|
| 5,317,743 | A | * | 5/1994 | Imai et al. .................. 717/160 |
| 5,579,494 | A | * | 11/1996 | Zaiki .......................... 712/241 |
| 5,634,059 | A | * | 5/1997 | Zaiki .......................... 717/160 |
| 6,016,397 | A | * | 1/2000 | Ogasawara et al. ......... 717/160 |
| 6,289,507 | B1 | | 9/2001 | Tanaka et al. |

OTHER PUBLICATIONS

Ikuo Miyoshi et al., "A Parallelizing Compiler for Message-Passing Multiprocessor", IPSJ SIG Notes, Technical Report, Jul. 22, 1994, vol. 94, No. 65, pp. 35-36 (94-PRG-18-5) along with partial English translation.

Hans Zima et al., "Supercompilers for Parallel and Vector Computers", Addison Wesley Publishing Company Inc., 1991.

* cited by examiner

Partial program P1

Partial program P4

FIG. 4A
Iteration 0

ST12 — b[0] = a0 + a1 + a2;
ST13 — a0 = a1;
ST14 — a1 = a2;
a2 = a[3];

FIG. 4B
Iteration 1

ST21
ST22 — b[1] = a0 + a1 + a2;
ST23 — a0 = a1;
ST24 — a1 = a2;
a2 = a[4];

Iteration i

Iteration i+1

FIG. 9A
Iteration i from which name dependence has been removed

ST45
ST46
ST47
ST48

```
b[i] = a0 + a1 + a2;
a0_i = a1;
a1_i = a2;
a2_i = a[i+3];
```

FIG. 9B
Iteration i+1 from which name dependence has been removed

Set of equality expressions with respect to iteration i
from which name dependence has been removed E45
{ (b[i], a0+a1+a2) }

Set of equality expressions with respect to iteration i+1
from which name dependence has been removed E55
{ (b[i], a0+a1+a2) (b[i+1], a0_i+a1_i+a2_i)
  (a0_i, a1) (a1_i, a2) (a2_i, a[i+3]) }

E56
{ (b[i], a0+a1+a2) (b[i+1], a0_i+a1_i+a2_i)
  (a0_i, a1) (a0_i1, a1_i, a2) (a2_i, a[i+3]) }

E57
{ (b[i], a0+a1+a2) (b[i+1], a0_i+a1_i+a2_i)
  (a0_i, a1) (a0_i1, a1_i, a2)
  (a1_i1, a2_i, a[i+3]) }

E58
{ (b[i], a0+a1+a2) (b[i+1], a0_i+a1_i+a2_i)
  (a0_i, a1) (a0_i1, a1_i, a2)
  (a1_i1, a2_i, a[i+3]) (a2_i1, a[i+4]) }

FIG. 11A
Iteration i+2 from which name dependence has been removed

ST65

```
b[i+2] = a0_i1 + a1_i1 + a2_i1;

a0_i2 = a1_i1;

a1_i2 = a2_i1;

a2_i2 = a[i+5];
```

FIG. 11B
Set of equality expressions with respect to iteration i+2 from which name dependence has been removed

E65

{ (b[i], a0+a1+a2) (b[i+1], a0_i+a1_i+a2_i)
  (b[i+2], a0_i1 + a1_i1 + a2_i1)
  (a0_i, a1) (a0_i1, a1_i, a2)
  (a1_i1, a2_i, a[i+3]) (a2_i1, a[i+4]) }

{ (b[i], a0+a1+a2) (b[i+1], a0_i+a1_i+a2_i)
  (b[i+2], a0_i1 + a1_i1 + a2_i1)
  (a0_i, a1) (a0_i1, a1_i, a2)
  (a0_i2, a1_i1, a2_i, a[i+3]) (a2_i1, a[i+4]) }

{ (b[i], a0+a1+a2) (b[i+1], a0_i+a1_i+a2_i)
  (b[i+2], a0_i1 + a1_i1 + a2_i1)
  (a0_i, a1) (a0_i1, a1_i, a2)
  (a0_i2, a1_i1, a2_i, a[i+3])
E68
  (a1_i2, a2_i1, a[i+4]) }

{ (b[i], a0+a1+a2) (b[i+1], a0_i+a1_i+a2_i)
  (b[i+2], a0_i1 + a1_i1 + a2_i1)
  (a0_i, a1) (a0_i1, a1_i, a2)
  (a0_i2, a1_i1, a2_i, a[i+3])
  (a1_i2, a2_i1, a[i+4]) (a2_i2, a[i+5]) }

FIG. 12A
Iteration i+3 from which name dependence has been removed

```
b[i+3] = a0_i2 + a1_i2 + a2_i2;

a0_i3 = a1_i2;

a1_i3 = a2_i2;

a2_i3 = a[i+6];
```

FIG. 12B
Set of equality expressions with respect to iteration i+3
from which name dependence has been removed

Iteration i+3 from which true dependence has been removed

Candidate modified iteration

```
b[k] = a[k] + a[k+1] + a[k+2];

a0_k = a[k+1];

a1_k = a[k+2];

a2_k = a[k+3];
```

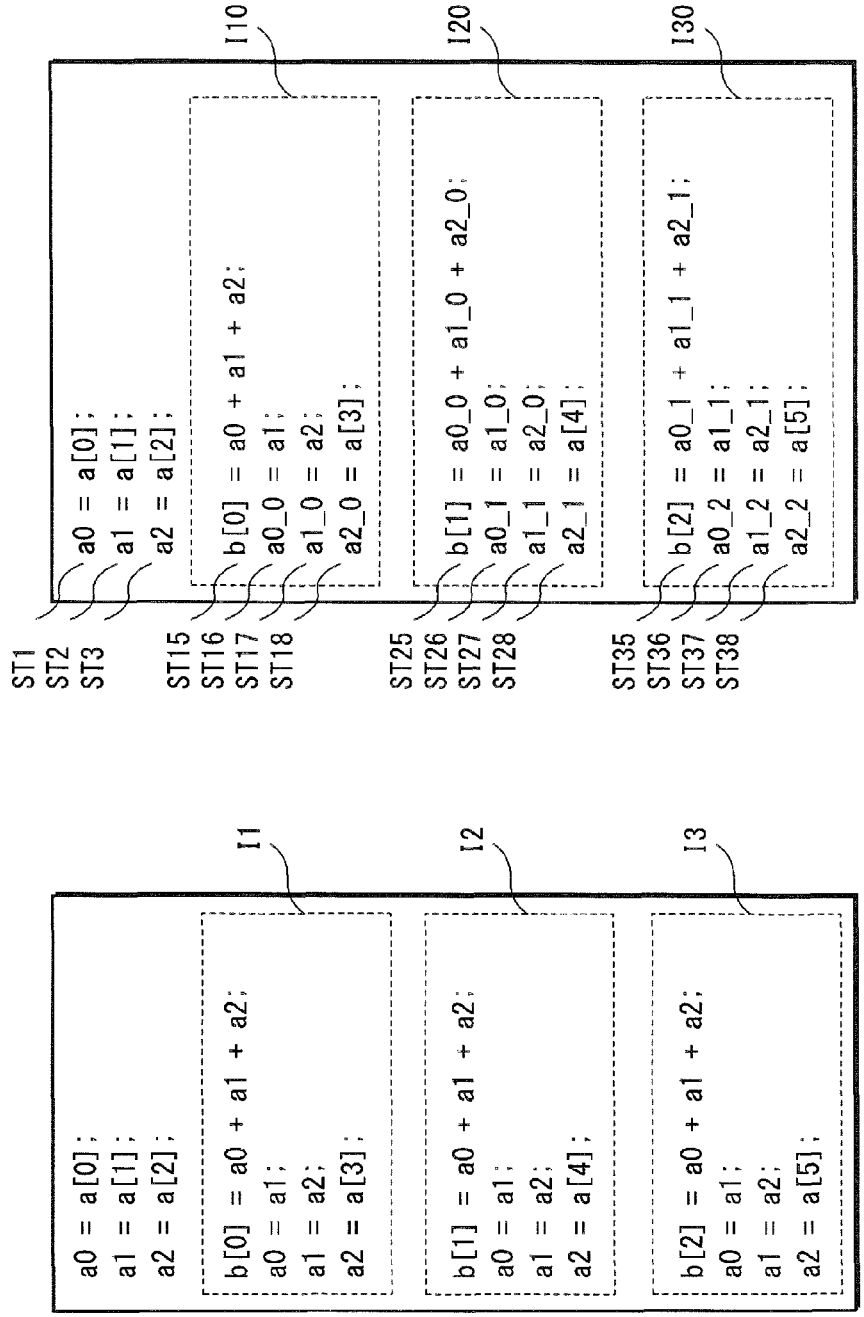

FIG. 15

Set of equality expressions with respect to statements
ST1 to ST3, ST15 to ST18, ST25 to ST28

Set of equality expressions with respect to statements ST35 to ST38

Partial program P2

```
    int a[103];
ST4 int b[100];
ST1 int a0, a1, a2;
ST2 a0 = a[0];
ST3 a1 = a[1];
    a2 = a[2];
    for (k = 0; k < 100; i++) {
ST92   b[k] = a[k] + a[k+1] + a[k+2];
ST93   a0_k = a[k+1];
ST94   a1_k = a[k+2];
       a2_k = a[k+3];
    }
```

FIG. 17A

Iterations 0 to 2 from which true dependence has been removed

Partial program P3

```
int a[103];
int b[100];

for(k = 0; k < 100; k++) {
    b[k] = a[k] + a[k+1] + a[k+2];
}
```

FIG. 19A
Loop R5

```
for (k = 2; k < 100; k++) {
   b[k] = a[k] + 10;
   c[k] = b[k-2];
}
```
R5

FIG. 19B
Loop R6

```
for (k = 2; k < 100; k++) {
   b[k] = a[k] + 10;
   c[k] = a[k-2] + 10;
}
```
R6

FIG. 19C
Loop R7

```
for (k = 0; k < 100; k++) {
   c[k] = b[k];
   b[k+2] = a[k+2];
}
```
R7

FIG. 19D
Loop R8

```
for (k = 1; k < 100; k++) {
   c[k] = a[k];
   b[k+2] = a[k+2];
}
```
R8

FIG. 20A
Iteration i+2

ST61  
ST62   b[i+2] = a0 + a1 + a2;  
ST63   a0 = a1;  
ST64   a1 = a2;  
       a2 = a[i+5];

FIG. 20B
Iteration i+3

ST71  
ST72   b[i+3] = a0 + a1 + a2;  
ST73   a0 = a1;  
ST74   a1 = a2;  
       a2 = a[i+6];

FIG. 20C
Iteration i+3 after copy propagation

```
b[i+3] = a[i+3] + a[i+4] + a[i+5];

a0 = a[i+4];

a1 = a[i+5];

a2 = a[i+6];
```

PROGRAM GENERATION DEVICE, PROGRAM PRODUCTION METHOD, AND PROGRAM

TECHNICAL FIELD

The present invention relates to technology for generating a new program by referencing a source program including a loop.

BACKGROUND ART

There are a known compiler and the like that each generate, by referencing a source program including a loop, a new program to be shared and executed by a plurality of processors to execute predetermined processing to be realized by the loop (e.g. Patent Literature 1).

Here, the loop is for executing a block composed of one or more statements N (N≥2) times.

According to the technology disclosed in Patent Literature 1, it is possible to generate a new program configured to, for example, divide the loop for executing the block N times into two partial loops that are each for executing the block N/2 times and are to be independently executed in parallel by two processors. Therefore, with the technology disclosed in Patent Literature 1, the loop for executing the block N times is executed at high speed.

CITATION LIST

Patent Literature

[Patent Literature 1]
Japanese Patent No. 3028821
[Patent Literature 2]
Japanese Patent No. 3234552

Non-Patent Literature

[Non-Patent Literature 1]
Hans Zima et al., "Supercompilers for Parallel and Vector Computers", Addison Wesley Publishing Company Inc., 1991 (Japanese translation) Yoichi Muraoka, "Supercompilers", Ohmsha, 1995

Summary of Invention

Technical Problem

The method disclosed in Patent Literature 1, however, is inapplicable to a case where the source program includes the loop and has such dependence that a variable defined in a statement in the block pertaining to the $i^{th}$ (1≤i<N) execution is referenced by a statement in the block pertaining to the $j^{th}$ (i<j≤N) execution. That is to say, with the method disclosed in Patent Literature 1, a program to be executed by a plurality of processors to execute predetermined processing to be realized by the loop at high speed is not generated from a source program including the loop and having such dependence.

The present invention has been conceived in view of the above problem. A purpose of the present invention is to provide a program generation apparatus that is useful in generating, by referencing the source program including the loop and having the above-mentioned dependence, the program to be executed by a plurality of processors to execute the predetermined processing to be realized by the loop at high speed.

Solution to Problem

In order to solve the above-presented problem, one aspect of the present invention is a program generation apparatus for generating a program by referencing a source program including a loop for executing a block composed of one or more statements N times (N≥2), the source program having such dependence that a variable defined in a statement in the block pertaining to $i^{th}$ execution (1≤i<N) is referenced by a statement in the block pertaining to $j^{th}$ execution (i<j≤N), the program generation apparatus comprising: a calculation unit configured to calculate equivalence relations between representations of variables included in the block pertaining to the $i^{th}$ execution and the block pertaining to any other execution than the $i^{th}$ execution; a specification unit configured to specify, with respect to each of representations of any target variable causing the dependence among the variables, a representation of a variable not causing the dependence that is equivalent to the representation of the target variable among the variables, based on the equivalence relations calculated by the calculation unit; and a generation unit configured to generate a program so that the generated program is for executing the block M times (M≤N) and includes a statement including the representation of the variable specified by the specification unit.

Advantageous Effects of Invention

The program generation apparatus of the present invention having the above-mentioned configuration is capable of generating, by referencing the source program including the loop and having the above-mentioned dependence, the program to be executed by a plurality of processors to execute the predetermined processing to be realized by the loop at high speed.

BRIEF DESCRIPTION OF DRAWINGS

FIGS. 4A and 4B illustrate data dependence in the loop R1.

FIG. 9A illustrates the iteration i from which name dependence has been removed. FIG. 9B illustrates the iteration i+1 from which the name dependence has been removed.

FIG. 10A illustrates calculation results of equivalence relations between representations of variables with respect to statements in the iteration i from which the name dependence has been removed. FIG. 10B illustrates calculation results of equivalence relations between representations of variables with respect to statements in the iteration i+1 from which the name dependence has been removed.

FIG. 11A illustrates an iteration i+2 from which the name dependence has been removed. FIG. 11B illustrates calculation results of equivalence relations between representations of variables with respect to statements in the iteration i+2 from which the name dependence has been removed.

FIG. 12A illustrates an iteration i+3 from which the name dependence has been removed. FIG. 12B illustrates calculation results of equivalence relations between representations of variables with respect to statements in the iteration i+3 from which the name dependence has been removed.

FIG. 13A illustrates the iteration i+3 from which all true dependence has been removed. FIG. 13B illustrates a candidate modified iteration.

FIG. 14A illustrates iterations 0, 1 and 2 of the loop R1. FIG. 14B illustrates the iterations 0, 1 and 2 from which the name dependence has been removed.

FIG. 15 illustrates calculation results of equivalence relations between representations of variables with respect to statements in the iterations 0 and 1 from which the name dependence has been removed.

FIG. 16 illustrates calculation results of equivalence relations between representations of variables with respect to statements in the iteration 2 from which the name dependence has been removed.

FIG. 17A illustrates the iterations 0, 1 and 2 from which the true dependence has been removed. FIG. 17B illustrates a partial program P2.

FIG. 18 illustrates a partial program P3.

FIGS. 19A, 19B, 19C and 19D respectively illustrate loops R5, R6, R7 and R8.

FIGS. 20A, 20B and 20C illustrate another method for calculating equivalence relations between representations of variables.

DESCRIPTION OF EMBODIMENT

The following describes an embodiment of the present invention with reference to the drawings.

Embodiment

Outline

Figure 2A:
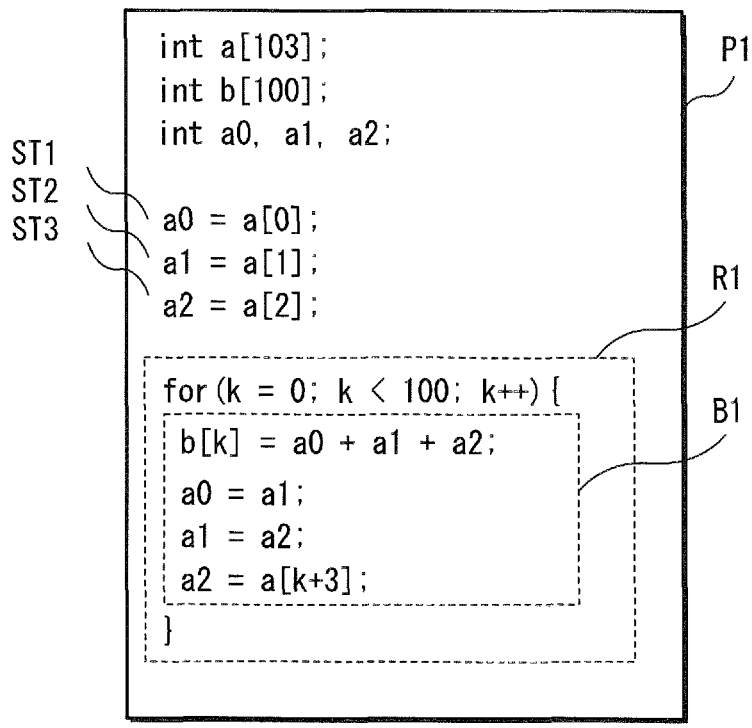
FIG. 2A illustrates a partial program P1 including a loop R1.
Figure 2B:
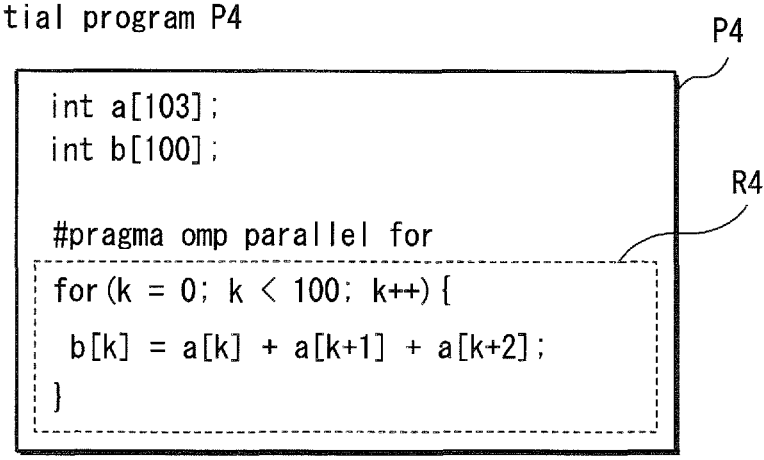
FIG. 2B illustrates a partial program P4 including a loop R4.

FIGS. 2A and 2B respectively illustrate equivalent partial programs P1 and P4 from which the same results can be obtained with respect to an array b[k] (0≤k≤99) upon completion of execution.

A program generation apparatus in the present embodiment is obtained by improving a conventional compiler. The program generation apparatus in the present embodiment generates, by referencing a source program including the partial program P1 illustrated in FIG. 2A, an assembler program similar to an assembler program that the conventional compiler can generate by referencing a source program including the partial program P4 illustrated in FIG. 2B, which is generated in advance by a programmer.

Here, the partial program P1 includes a loop R1 and has true dependence. Although details of the true dependence are described later, the true dependence is such dependence that a variable defined in a statement in a block B1 to be executed when a loop control variable k is i (0≤i<99) is referenced by a statement in the block B1 to be executed when the loop control variable k is i+1.

If statements between which there is the true dependence are executed in reverse order, correct results cannot be obtained. Therefore, the block B1 is generally sequentially executed with incrementing the loop control variable k by one.

On the other hand, the partial program P4 including a loop R4 does not have the true dependence as described above. Therefore, the partial program P4 is executable by a plurality of processors. For example, the loop R4 may be divided into a partial loop to be executed when the loop control variable k is 0 to 49 and a partial loop to be executed when the loop control variable k is 50 to 99, and two processors may independently execute the partial loops in parallel. By the above-mentioned method, the predetermined processing to be realized by the loop is executed at higher speed, compared with a case where a single processer sequentially executes the block B1 while the loop control variables k is 0 to 99.

As described above, the program generation apparatus in the present embodiment generates, by referencing a source program including the partial program P1 illustrated in FIG. 2A, an assembler program similar to an assembler program that the conventional compiler can generate by referencing a source program including the partial program P4 illustrated in FIG. 2B.

Therefore, the program generation apparatus in the present embodiment is effective in generating an assembler program suitable for parallel execution without regenerating a source program, such as the partial program P4, including a loop and not having the true dependence, when a source program, such as the partial program P1, including a loop and having the true dependence has already generated.

Although the partial program P1 includes the loop R1 and has the true dependence as described above, the partial program P1 is more suitable for high-speed execution by a single processor than the partial program P4 for the following reason.

It is generally known that a program is executed at higher speed by allocating, to registers, as many variables in the program as possible. This is because access to the register is provided at higher speed than access to a memory.

In a general compiler, it is likely that a specific register is allocated to a simple variable such as a0, a1 and a2 included in the partial program P1. Therefore, the number of accesses to the memory is reduced when the partial program P1 is executed, compared with a case where the partial program P4 is executed. That is to say, when a single processor is used, the partial program P1 is executed at higher speed than the partial program P4.

<Data Dependence>

Figure 3:
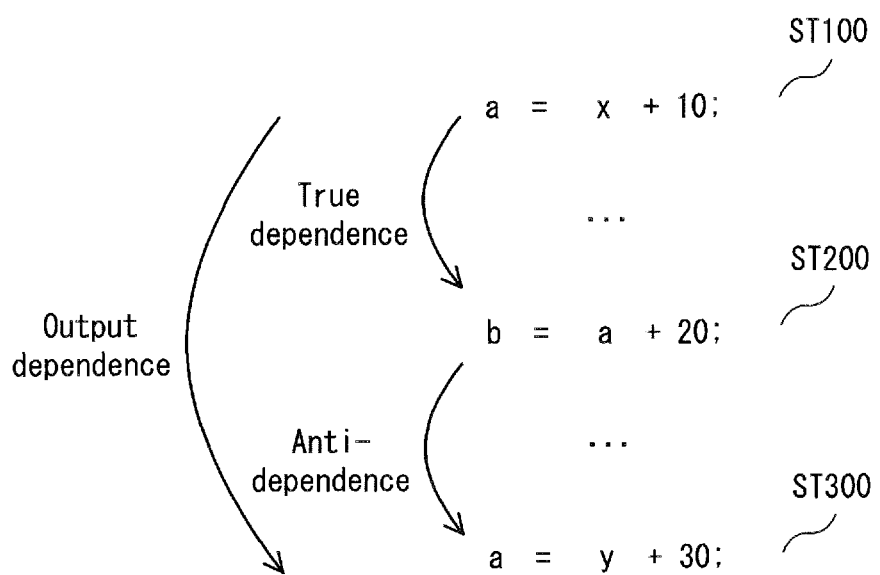
FIG. 3 illustrates data dependence.

The following describes data dependence including the above-mentioned true dependence, with use of FIG. 3.

FIG. 3 illustrates the data dependence.

As illustrated in FIG. 3, a variable "a" defined in a statement ST100 is referenced by a statement ST200 to be executed after the statement ST100 is executed. In such a case, there is "true dependence" of the statement ST200 on the statement ST100.

Also as illustrated in FIG. 3, the variable "a" referenced by the statement ST200 is defined in a statement ST300 to be executed after the statement ST200 is executed. In such a case, there is "anti-dependence" of the statement ST300 on the statement ST200.

Also as illustrated in FIG. 3, the variable "a" defined in the statement ST100 is redefined in the statement ST300. In such a case, there is "output dependence" of the statement ST300 on the statement ST100.

Hereinafter, a variable causing the true dependence, the anti-dependence and the output dependence is referred to as a "dependence-causing variable". In an example illustrated in FIG. 3, the variable "a" is the dependence-causing variable.

It is known that the "anti-dependence" and the "output dependence" are removed by renaming the dependence-causing variable so that representations of the dependence-causing variable are different from each other in statements between which there is the dependence (see, for example, page 113 of Non-Patent Literature 1). Therefore, the "anti-dependence" and the "output dependence" are sometimes called "name dependence".

The data dependence is specifically described below by taking the loop R1 included in the above-mentioned partial program P1 as an example.

FIGS. 4A and 4B illustrate the data dependence in the loop R1 illustrated in FIG. 2A.

Hereinafter, a block in a loop to be executed when the loop control variable is m (m is a given value that the loop control variable can take) is referred to as an "iteration m", generating the iteration m is referred to as "expanding the iteration with respect to m", and the value m is referred to as an "iteration number".

FIG. 4A illustrates the block B1 to be executed when the loop control variable k in the loop R1 illustrated in FIG. 2 is 0, i.e. an iteration 0. FIG. 4B illustrates an iteration 1.

Here, variables a0, a1 and a2 respectively defined in statements ST12, ST13 and ST14 in the iteration 0 illustrated in FIG. 4A are referenced by a statement ST21 in the iteration 1 illustrated in FIG. 4B.

Also, the variables a1 and a2 respectively defined in the statements ST13 and ST14 in the iteration 0 illustrated in FIG. 4A are respectively referenced by statements ST22 and ST23 in the iteration 1 illustrated in FIG. 4B.

That is to say, there is the true dependence of the statement ST21 on the statement ST12 caused by the variable a0. Also, there are the true dependence of the statement ST21 on the statement ST13 caused by the variable a1 and the true dependence of ST22 on the statement ST13 caused by the variable a1. Furthermore, there are the true dependence of the statements ST21 on the statement ST14 caused by the variable a2 and the true dependence of the statement ST23 on the statement ST14 caused by the variable a2.

Also, the variable a0 defined in the statement ST12 in the iteration 0 illustrated in FIG. 4A is redefined in the statement ST22 in the iteration 1 illustrated in FIG. 4B.

That is to say, there is the output dependence of the statement ST22 on the statement ST12 caused by the variable a0. Similarly, there are the output dependence of the statement ST23 on the statement ST13 caused by the variable a1 and the output dependence of the statement ST24 on the statement ST14 caused by the variable a2.

Also, the variables a0, a1 and a2 referenced by the statement ST21 in the iteration 1 illustrated in FIG. 4B are respectively defined in the statements ST22, ST23 and ST24. That is to say, there are the anti-dependence of the statement ST22 on the statement ST21 caused by the variable a0, the anti-dependence of the statement ST23 on the statement ST21 caused by the variable a1, and the anti-dependence of the statement ST24 on the statement ST21 caused by the variable a2.

Similarly, there is the anti-dependence caused by the variables a0, a1 and a2 in the iteration 0.

Note that, hereinafter, the dependence of a statement in a given iteration on a statement of another iteration of the loop is also referred to as "dependence between iterations".

<Configuration>

Figure 1:
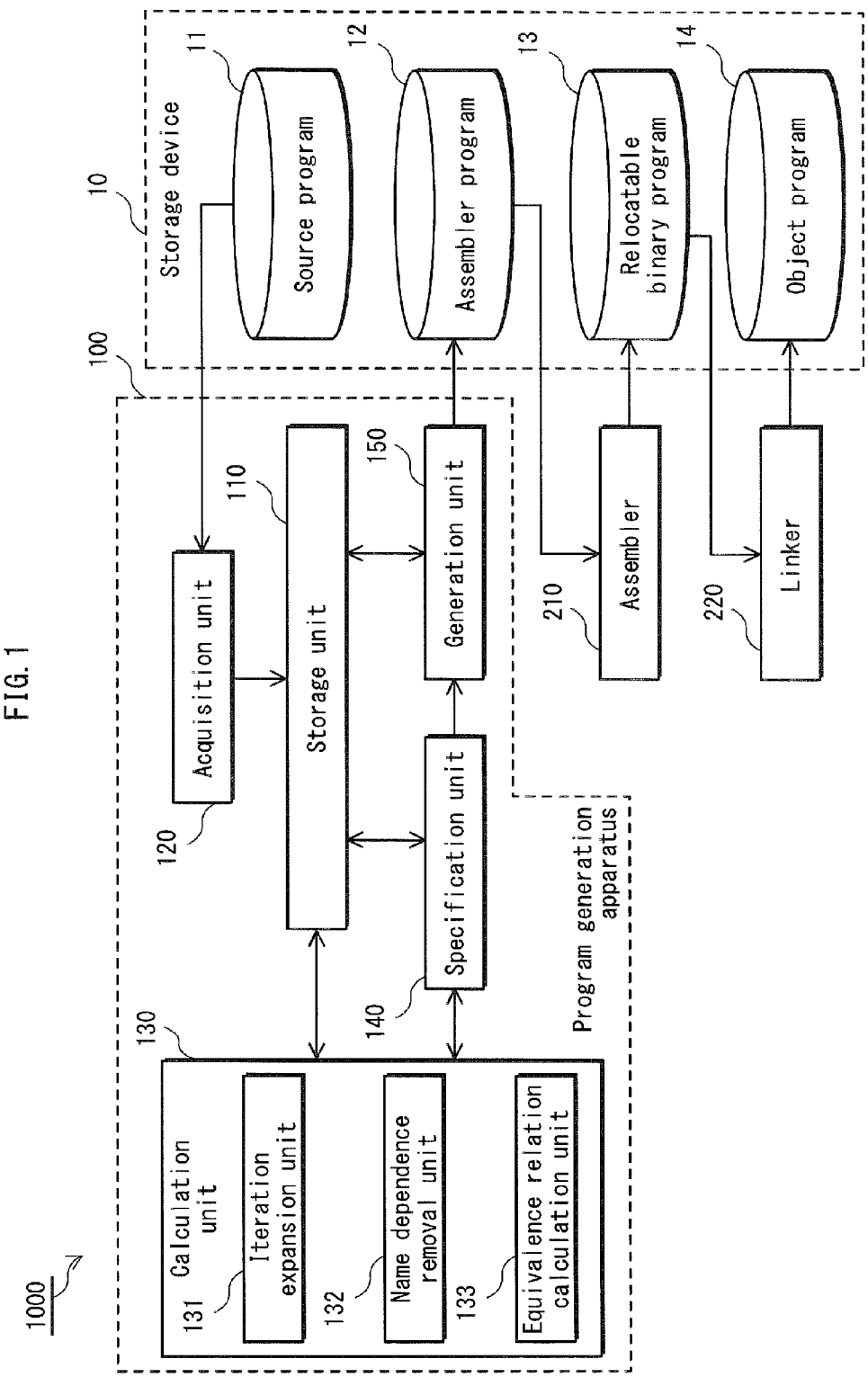
FIG. 1 is a block diagram illustrating a configuration of a compiler system 1000 including a program generation apparatus 100 pertaining to the embodiment.

FIG. 1 is a block diagram illustrating a configuration of a compiler system 1000 including a program generation apparatus 100 in the present embodiment.

The compiler system 1000 generates, by referencing a source program 11, such as the partial program P1 described above, including a loop and having the true dependence between iterations, an object program 14 to be executed in parallel by a plurality of processors to execute the predetermined processing to be realized by the loop.

The compiler system 1000 is embodied as a computer (e.g. PC (Personal Computer)) including a processor (not illustrated), a memory (not illustrated) and a storage device 10 such as a hard disk.

As illustrated in FIG. 1, the compiler system 1000 includes the storage device 10, the program generation apparatus 100, an assembler 210 and a linker 220. Note that functions of the program generation apparatus 100, the assembler 210 and the linker 220 are implemented by the above-mentioned processor reading, into the above-mentioned memory, a program (not illustrated) stored in the storage device 10 and executing the read program.

Here, the program generation apparatus 100 is obtained by improving a conventional compiler. The program generation apparatus 100 has a function of generating an assembler program 12 by referencing the source program 11 stored in the storage device 10 and written in a high-level language such as the C language and the C++ language. The program generation apparatus 100 stores the generated assembler program 12 in the storage device 10.

That is to say, the program generation apparatus 100 generates, by referencing the source program 11 including the loop and having the true dependence between iterations, the assembler program 12 that is for executing the predetermined processing to be realized by the loop and does not have the true dependence.

The assembler 210 has a function of generating, by referencing the assembler program 12 stored in the storage device 10 by the program generation apparatus 100, a relocatable binary program 13 written in a machine language. The assembler 210 stores the generated relocatable binary program 13 in the storage device 10.

The linker 220 has a function of generating the object program 14 executable by a computer, by determining a location of an address and the like of unresolved data in the relocatable binary program 13 stored in the storage device 10 by the assembler 210, and linking a necessary library and the like with the relocatable binary program 13 in which the location of an address and the like of unresolved data are determined. The linker 220 stores the generated object program 14 in the storage device 10.

The following describes a configuration of the program generation apparatus 100 in more detail, with use of FIG. 1.

As illustrated in FIG. 1, the program generation apparatus 100 includes a storage unit 110, an acquisition unit 120, a calculation unit 130, a specification unit 140 and a generation unit 150.

The storage unit 110 is a memory area for storing therein the source program 11 and results of processing performed by the calculation unit 130, the specification unit 140 and the generation unit 150.

That is to say, the results of processing are exchanged among the calculation unit 130, the specification unit 140 and the generation unit 150 via the storage unit 110, although this is hereinafter not specified.

The acquisition unit 120 has a function of reading the source program 11 from the storage device 10 and storing the read source program 11 in the storage unit 110.

The calculation unit 130 has a function of calculating equivalence relations between representations of variables with respect to a given iteration and other one or more iterations of the loop included in the source program 11 stored in the storage unit 110 by the acquisition unit 120. The calculation unit 130 includes an iteration expansion unit 131, a name dependence removal unit 132 and an equivalence relation calculation unit 133.

The iteration expansion unit 131 has a function of expanding iterations based on the loop included in the source program 11.

The name dependence removal unit 132 has a function of removing the name dependence (i.e. the output dependence and the anti-dependence) between two iterations having been expanded by the iteration expansion unit 131 and having consecutive iteration numbers.

Here, the name dependence is removed by a method similar to a conventional method of renaming the dependence-causing variable so that representations of the dependence-causing variable are different from each other in two statements between which there is the dependence.

The equivalence relation calculation unit 133 has a function of calculating equivalence relations between representations of variables with respect to statements in the two iterations from which the name dependence has been removed by the name dependence removal unit 132. Here, the equivalence relations between representations of variables are calculated by a method similar to the method disclosed in Patent Literature 2.

The specification unit 140 has a function of judging whether nor not all true dependence can be removed by replacing all true dependence-causing variables in the two iterations with other equivalent variables not causing the true dependence or expressions, based on the equivalence relations between representations of variables calculated by the equivalence relation calculation unit 133.

The specification unit 140 also has a function of, based on results of the judgment, controlling the calculation of the equivalence relations between representations of variables performed by the calculation unit 130, and judging whether or not a block of the loop included in the source program 11 can be replaced with a candidate modified iteration (described later) generated by the generation unit 150.

The generation unit 150 has a function of generating, when the specification unit 140 judges that all true dependence between the two iterations can be removed, the candidate modified iteration based on the iteration from which all true dependence has been removed.

Although details of the candidate modified iteration are described later (see FIGS. 13A and 13B), the candidate modified iteration is obtained by generalizing the above-mentioned iteration from which all true dependence has been removed so that the iteration from which all true dependence has been removed can be applied to other iterations having greater iteration numbers.

The generation unit 150 has a function of generating the assembler program 12 when the specification unit 140 judges that the block of the loop included in the source program 11 can be replaced with the candidate modified iteration. The assembler program 12 is generated based on a source program obtained by replacing the block of the loop included in the source program 11 with the candidate modified iteration.

<Operations>

The following describes operations of the program generation apparatus 100.

Figure 5:
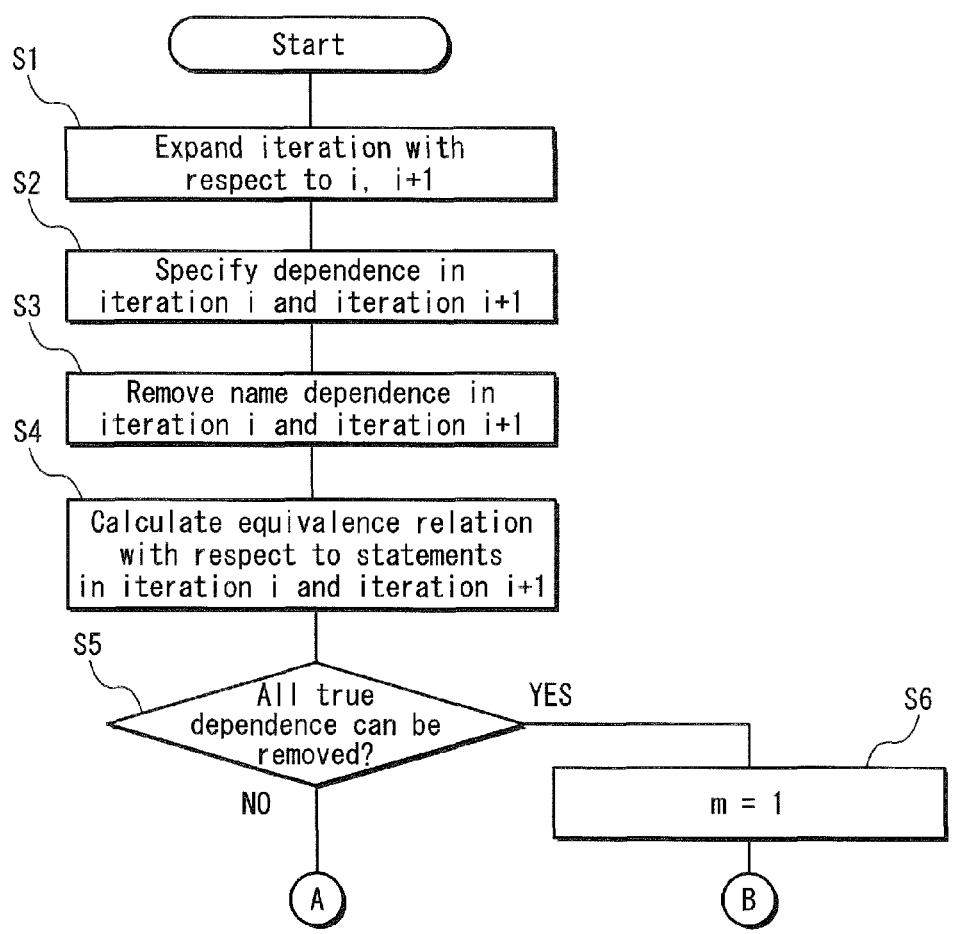
FIG. 5 is a flow chart showing program generation processing performed by the program generation apparatus 100 and being followed by a flow chart of FIG. 6.
Figure 6:
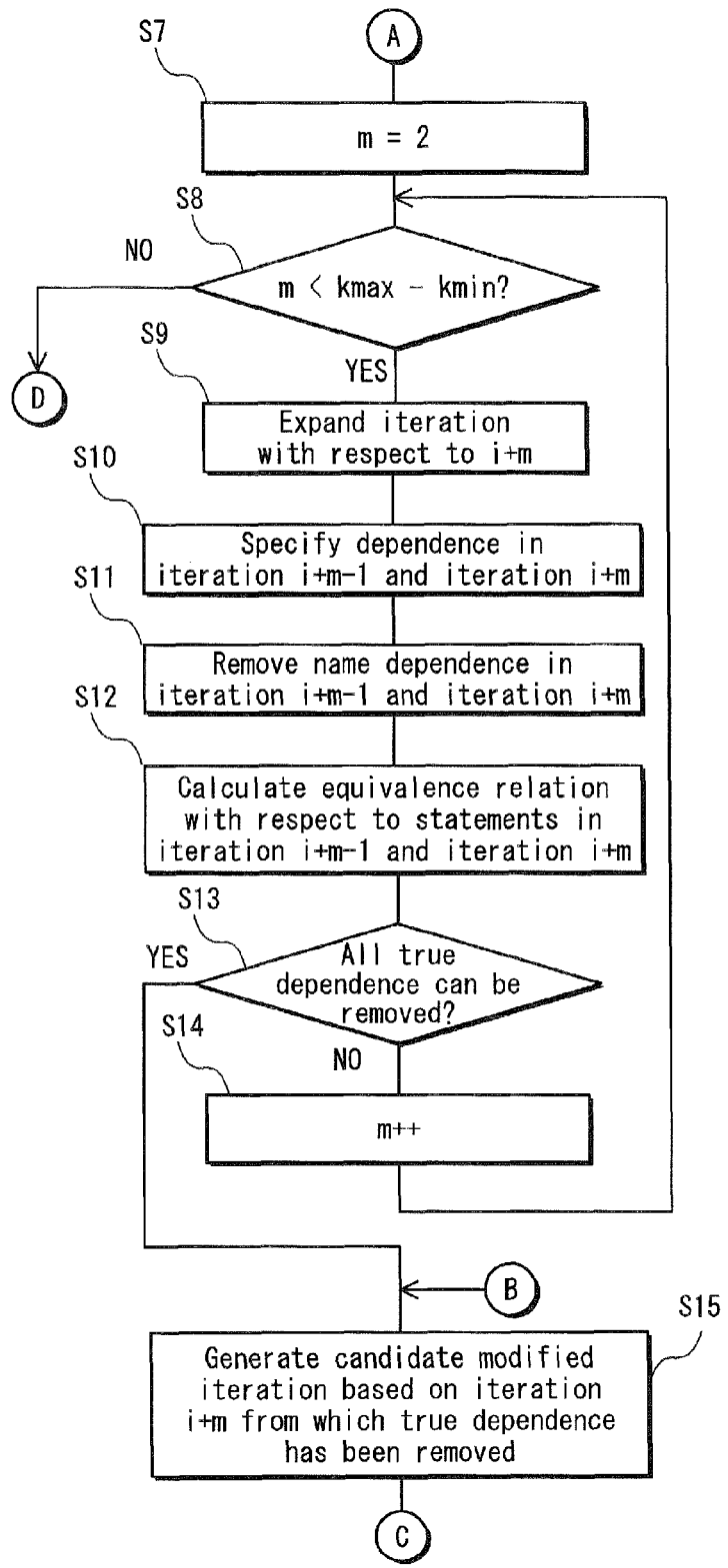
FIG. 6 is the flow chart showing the program generation processing performed by the program generation apparatus 100 and following the flow chart of FIG. 5, and being followed by a flow chart of FIG. 7.
Figure 7:
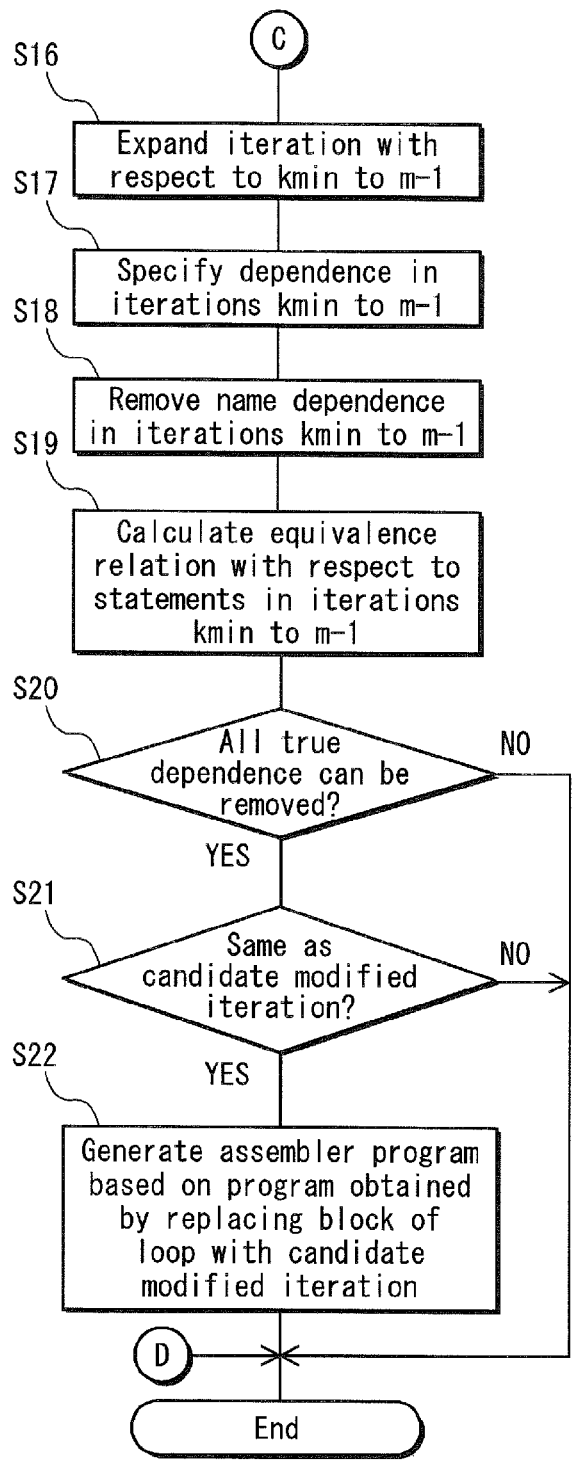
FIG. 7 is the flow chart showing the program generation processing performed by the program generation apparatus 100 and following the flow chart of FIG. 6.

FIGS. 5, 6 and 7 are each flow charts showing program generation processing performed by the program generation apparatus 100.

The acquisition unit 120 included in the program generation apparatus 100 reads the source program 11 from the storage device 10 and stores the read source program 11 in the storage unit 110. The iteration expansion unit 131 included in the calculation unit 130 expands the iteration with respect to i, which is a given value that the loop control variable in the loop included in the source program 11 can take, and i+1 (step S1 in FIG. 5).

The name dependence removal unit 132 included in the calculation unit 130 specifies the dependence between statements in the iteration i and the iteration i+1 (step S2). The name dependence removal unit 132 also removes the name dependence (i.e. the output dependence and the anti-dependence) by changing a representation of the name dependence-causing variable (step S3).

The equivalence relation calculation unit 133 included in the calculation unit 130 calculates equivalence relations between representations of variables with respect to statements in the iteration i and the iteration i+1 from which the name dependence has been removed (step S4).

Since being similar to the method disclosed in Patent Literature 2 as described above, the method of calculating the equivalence relations between representations of variables is briefly described below. As a result of the calculation, a set of equality expressions as illustrated in FIGS. 10A and 10B is obtained.

Here, in FIGS. 10A and 10B, one or more expressions enclosed in the parentheses "{" and "}" are collectively referred to as the "set of equality expressions", and an expression included in the set of equality expressions and enclosed in the parentheses "(" and ")" is referred to as the "equality expression". Elements included in each of the equality expressions and separated by commas are equivalent to one another.

First, the equivalence relation calculation unit 133 performs the following processing for statements in the iteration i and the iteration i+1 one by one.

That is to say, the equivalence relation calculation unit 133 judges whether or not the equality expression including a variable or an expression on the right or left side of each statement is already included in the set of equality expressions.

When judging that the equality expression is not included in the set of equality expressions, the equivalence relation calculation unit 133 adds a new equality expression for the statement to the set of equality expressions.

When judging that the equality expression including a variable or an expression on the right side of the statement is already included in the set of equality expressions, the equivalence relation calculation unit 133 adds a variable or an expression on the left side of the statement as an element of the equality expression.

When judging that the equality expression including the variable or the expression on the left side of the statement is already included in the set of equality expressions, the equivalence relation calculation unit 133 adds, in place of the equality expression, a new equality expression for the statement to the set of equality expressions.

The following describes subsequent steps of the program generation processing (see FIG. 5).

Upon completion of the processing in the step S4, the specification unit 140 judges whether or not all true dependence can be removed based on the equivalence relations between representations of variables calculated by the equivalence relation calculation unit 133 (step S5).

More specifically, the specification unit 140 judges that all true dependence can be removed when all true dependence-causing variables can be replaced with equivalent variables other than the dependence-causing variables specified in the step 2 and variables introduced to remove the name dependence in the step S3, or expressions, based on the equivalence relations between representations of variables calculated in the step S4 (step S5: YES).

Here, the true dependence-causing variables are replaced with neither the dependence-causing variables specified in the step 2 nor variables introduced to remove the name dependence in the step S3, because such variables can cause new dependence in other iterations. That is to say, even when the true dependence-causing variables are replaced with such variables, there is a possibility that the dependence between iterations is not eventually removed.

When judging that all true dependence can be removed (step S5: YES), the specification unit 140 sets the value of m to "1" in the iteration i+m from which all true dependence has been removed (step S6), and processing proceeds to a step S15 in FIG. 6.

When judging that all true dependence cannot be removed (step S5: NO), the specification unit 140 sets the value of m to "2" (step S7 in FIG. 6).

The specification unit 140 then judges whether or not the value of m is smaller than a value obtained by subtracting a minimum value (hereinafter, a "kmin") that the loop control variable included in the source program 11 can take from a maximum value (hereinafter, a "kmax") that the loop control variable included in the source program 11 can take (step S8).

When the value of m is equal to or greater than the value obtained by subtracting the kmin from the kmax (step S8: NO), the program generation apparatus 100 terminates the program generation processing for failing to remove the true dependence (see FIG. 7).

On the other hand, when the value of m is smaller than the value obtained by subtracting the kmin from the kmax (step S8: YES), the specification unit 140 notifies the calculation unit 130 of the value of m to instruct the calculation unit 130 to perform processing. The iteration expansion unit 131 included in the calculation unit 130 having been instructed to perform processing expands the iteration with respect to i+m, similarly to the processing in the step S1 (step S9).

The name dependence removal unit 132 specifies the dependence between statements in the iteration i+m−1 and the iteration i+m, similarly to the processing in the step S2 (step S10), and removes the name dependence, similarly to the processing in the step S3 (step S11).

The equivalence relation calculation unit 133 calculates equivalence relations between representations of variables with respect to statements in the iteration i+m−1 and the iteration i+m from which the name dependence has been removed, similarly to the processing in the step S4 (step S12).

The specification unit 140 then judges whether or not all true dependence can be removed based on the equivalence relations between representations of variables calculated by the equivalence relation calculation unit 133 in the step S12, similarly to the processing in the step S5 (step S13).

Here, the specification unit 140 uses, as the representations of variables for replacing the representations of the true dependence-causing variables, neither the dependence-causing variables specified in the steps S2 and S10 nor variables introduced to remove the name dependence in the steps S3 and S11, for a similar reason as that described regarding the step S5.

When judging that all true dependence cannot be removed (step S13: NO), the specification unit 140 increments the value of m by one (step S14) and repeats the processing in the step S8 onward.

When the specification unit 140 judges that all true dependence can be removed (step S13: YES), the generation unit 150 generates the candidate modified iteration based on the iteration i+m from which all true dependence has been removed (step S15).

Here, the value i is a given value that the loop control variable in the loop included in the source program 11 can take. Therefore, the fact that all true dependence can be removed in the iteration i+m indicates that all true dependence can be removed in the iterations having iteration numbers equal to or greater than kmin+m.

The generation unit 150 thus generates the candidate modified iteration that is obtained by generalizing the iteration i+m from which all true dependence has been removed so that the iteration i+m from which all true dependence has been removed can be applied to other iterations having iteration numbers from kmin+m to kmax.

The specification unit 140 then notifies the calculation unit 130 of the values of kmin and m−1 to instruct the calculation unit 130 to perform processing. The iteration expansion unit 131 included in the calculation unit 130 having been instructed to perform processing expands the iterations with respect to kmin to m−1, similarly to the processing in the step S1 (step S16 in FIG. 7).

Also, the name dependence removal unit 132 specifies the dependence between statements in the iterations kmin to m−1, similarly to the processing in the step S2 (step S17), and removes the name dependence, similarly to the processing in the step S3 (step S18).

The equivalence relation calculation unit 133 calculates equivalence relations between representations of variables with respect to statements in the iterations kmin to m−1 from which the name dependence has been removed, similarly to the processing in the step S4 (step S19).

The specification unit 140 then judges whether or not all true dependence can be removed based on the equivalence relations between representations of variables calculated by the equivalence relation calculation unit 133 in the step S19, similarly to the processing in the step S5 (step S20).

When the specification unit 140 judges that all true dependence cannot be removed (step S20: NO), the program generation apparatus 100 terminates the program generation processing for failing to remove the true dependence when the loop control variable is kmin to m−1.

When judging that all true dependence can be removed (step S20: YES), the specification unit 140 judges whether or not the iterations kmin to m−1 from which all true dependence has been removed are the same as the iterations kmin to m−1 applied to the candidate modified iteration generated in the step S15 (step S21).

When the specification unit 140 judges that they are not the same (step S21: NO), the program generation apparatus 100 terminates the program generation processing. This is because, in this case, (i) the program that includes the loop applicable when the loop control variable is kmin to m−1 and does not have the true dependence and (ii) the program that includes the loop applicable when the loop control variable is m to kmax and does not have the true dependence cannot be put together into a program including a single loop.

On the other hand, when the specification unit 140 judges that they are the same (step S21: YES), the generation unit 150 generates the assembler program 12 in the following manner (step S22). That is to say, the generation unit 150 generates the assembler program 12 by optimizing and parallelizing a program that is obtained by replacing the block of the loop included in the source program 11 with the candidate modified iteration.

The optimization and the parallelization are achieved by a method conventionally used. Therefore, detailed descriptions thereof are omitted, and a specific example of the program obtained after the optimization and the parallelization is described later (see FIG. 18).

The generation unit 150 stores the generated assembler program 12 in the storage device 10, and thus the program generation apparatus 100 terminates the program generation processing.

Specific Example

The following describes operations of the program generation apparatus 100 in accordance with the flow charts of FIGS. 5, 6 and 7 by taking, as an example, a case where the source program 11 includes the partial program P1 illustrated in FIG. 2A.

The acquisition unit 120 included in the program generation apparatus 100 reads the source program 11 from the storage device 10 and stores the read source program 11 in the storage unit 110. The iteration expansion unit 131 included in the calculation unit 130 expands the iteration with respect to i, which is a given value that the loop control variable (k in this example) in the loop (R1 in this example) included in the source program 11 can take, and i+1 (step S1 in FIG. 5).

Figure 8A:
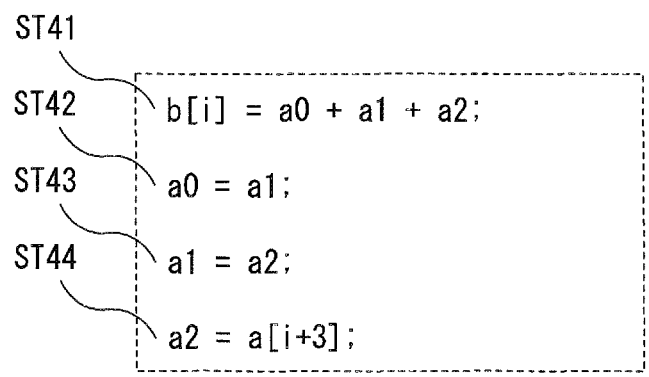
FIG. 8A illustrates an iteration i of the loop R1.
Figure 8B:
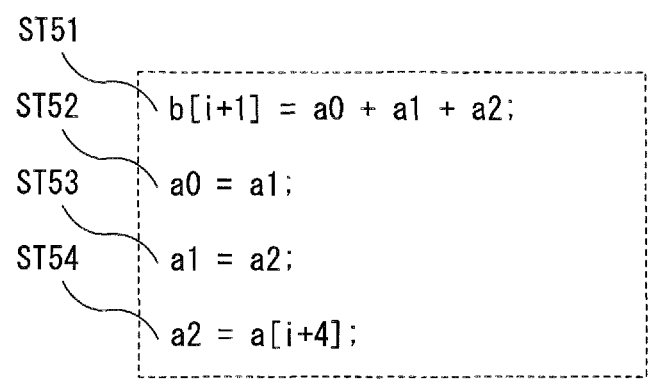
FIG. 8B illustrates an iteration i+1 of the loop R1.

FIGS. 8A and 8B respectively illustrate the iteration i and the iteration i+1 of the loop R1 illustrated in FIG. 2A.

The name dependence removal unit 132 included in the calculation unit 130 specifies the dependence between statements in the iteration i and the iteration i+1 (step S2). The name dependence removal unit 132 also removes the name dependence (i.e. the output dependence and the anti-dependence) by changing the representation of the name dependence-causing variable (step S3).

In the example illustrated in FIGS. 8A and 8B, there are the true dependence of the statement ST51 on the statement ST42, the output dependence of ST52 on the statement ST42, the anti-dependence of the statement ST42 on the statement ST41 and the anti-dependence of the statement ST52 on the statement ST51. All the dependence is caused by the variable a0.

Also, there are the true dependence of the statement ST51 on the statement ST43, the output dependence of ST53 on the statement ST43, the anti-dependence of the statement ST43 on the statement ST41 and the anti-dependence of the statement ST53 on the statement ST51. All the dependence is caused by the variable a1.

Furthermore, there are the true dependence of the statement ST51 on the statement ST44, the output dependence of ST54 on the statement ST44, the anti-dependence of the statement ST44 on the statement ST41 and the anti-dependence of the statement ST54 on the statement ST51. All the dependence is caused by the variable a2.

The name dependence caused by the variable a0 can be removed by replacing the representation of the variable a0 in the statement ST42 with "a0_i" and by replacing the representation of the variable a0 in the statement ST52 with "a0_i1".

Similarly to the case of the variable a0, the name dependence caused by the variable a1 can be removed by replacing the representation of the variable a1 in the statement ST43 with "a1_i" and by replacing the representation of the variable a1 in the statement ST53 with "a1_i1". Also, the name dependence caused by the variable a2 can be removed by replacing the representation of the variable a2 in the statement ST44 with "a2_i" and by replacing the representation of the variable a2 in the statement ST54 with "a2_i1".

FIG. 9A illustrates the iteration i illustrated in FIG. 8A from which the name dependence has been removed. FIG. 9B illustrates the iteration i+1 illustrated in FIG. 8B from which the name dependence has been removed.

Note that, since only the name dependence is removed in the step S3, there is the true dependence remaining. That is to say, in the example illustrated in FIGS. 9A and 9B, there is the true dependence of the statement ST55 on the statement ST46 caused by the variable a0_i, the true dependence of the statement ST55 on the statement ST47 caused by the variable a1_i, the true dependence of the statement ST55 on the statement ST48 caused by the variable a2_i, the true dependence of the statement ST56 on the statement ST47 caused by the variable a1_i and the true dependence of the statement ST57 on the statement ST48 caused by the variable a2_i.

The equivalence relation calculation unit 133 included in the calculation unit 130 calculates equivalence relations between representations of variables with respect to statements in the iteration i and the iteration i+1 from which the name dependence has been removed (step S4).

The following describes the equivalence relations between representations of variables with respect to statements (ST45, ST46, ST47, ST48 and ST55, ST56, ST57, ST58) in the iteration i and the iteration i+1 respectively illustrated in FIGS. 9A and 9B from which the name dependence has been removed.

Assume that no equality expression is included in a set of equality expressions at the beginning of the following description.

When the equivalence relations between representations of variables with respect to the statement ST45 are calculated, the equality expressions including a variable or an expression on the right and left sides of the statement ST45 are not included in the set of equality expressions. Therefore, the equality expressions with respect to the statement ST45 are added to the set of equality expressions as illustrated in a set of equality expressions E45 illustrated in FIG. 10A.

That is to say, the set of equality expressions E45 indicates that the variable "b[i]" and the expression "a0+a1+a2" are equivalent immediately after the statement ST45 is executed.

As for the statements ST46, ST47 and ST48 illustrated in FIG. 9A, and the statement ST55 illustrated in FIG. 9B, the equivalence relations between representations of variables are calculated similarly to the case of the statement ST45 (see sets of equality expressions E46, E47 and E48 illustrated in FIG. 10A, and the set of equality expressions E55 illustrated in FIG. 10B).

When the equivalence relations between representations of variables are calculated with respect to the statement ST56 illustrated in FIG. 9B, the equality expression ((a1_i, a2) in this example) including a variable ("a1_i" in this example) on the right side of the statement ST56 is already included in the set of equality expressions E55. Therefore, a variable ("a0_i1" in this example) on the left side of the statement ST56 is added to the equality expression (see a set of equality expressions E56 illustrated in FIG. 10B).

As for the statement ST57 illustrated in FIG. 9B, the equivalence relations between representations of variables are calculated similarly to the case of the statement ST56 (see a set of equality expressions E57 illustrated in FIG. 10B).

Also, as for the statement ST58 illustrated in FIG. 9B, the equality expression with respect to the statement ST58 is added to the set of equality expressions E57 similarly to the case of the statement ST45 (see a set of equality expressions E58 illustrated in FIG. 10B).

The specification unit 140 then judges whether or not all true dependence can be removed based on the equivalence relations between representations of variables calculated by the equivalence relation calculation unit 133 in the step S4 (step S5).

As described above, in the example illustrated in FIGS. 9A and 9B, there is true dependence caused by the variables a0_i, a1_i and a2_i.

According to the set of equality expressions E48 illustrated in FIG. 10A, the true dependence-causing variable "a2_i" is equivalent to a variable "a[i+3]". The variable "a[i+3]" is neither the dependence-causing variable specified in the step S2 nor the variable introduced to remove the name dependence in the step S3. Accordingly, the representation of the variable "a2_i" can be replaced with the representation of the variable "a[i+3]".

Also, according to the set of equality expressions E48, the true dependence-causing variables "a0_i" and "a1_i" are respectively equivalent to the variables "a1" and "a2". The variables "a1" and "a2", however, are the dependence-causing variables specified in the step S2, and thus the representations of the true dependence-causing variables "a0_i" and "a1_i" cannot be replaced with the representations of these variables.

The specification unit 140 therefore judges that all true dependence cannot be removed (step S5: NO).

The specification unit 140 sets the value of m to "2" (step S7 in FIG. 6), and notifies the calculation unit 130 of the value of m ("2" in this example) to instruct the calculation unit 130 to perform processing because the value of m is smaller than the value obtained by subtracting the kmin ("0" in this example) from the kmax ("99" in this example) (step S8: YES).

The iteration expansion unit 131 expands the iteration with respect to i+m ("i+2" in this example), similarly to the processing in the step S1 (step S9).

The name dependence removal unit 132 included in the calculation unit 130 removes the name dependence with respect to the iteration i+m−1 ("i+1" in this example) and the iteration i+m, similarly to the processing in the step S3 (step S11).

The equivalence relation calculation unit 133 included in the calculation unit 130 calculates equivalence relations between representations of variables with respect to statements in the iteration i+m−1 and the iteration i+m from which the name dependence has been removed, similarly to the processing in the step S4 (step S12).

FIG. 11A illustrates the iteration i+2 from which the name dependence has been removed. FIG. 11B illustrates calculation results of equivalence relations between representations of variables with respect to statements in the iteration i+2 from which the name dependence has been removed.

Here, a set of equality expressions E65 illustrated in FIG. 11B is obtained by adding an equality expression "(b[i+2], a0_i1+a1_i1+a2_i1)" to the set of equality expressions E58 illustrated in FIG. 10B, based on the statement ST65 illustrated in FIG. 11A.

The specification unit 140 judges whether or not all true dependence can be removed based on the equivalence relations between representations of variables calculated by the equivalence relation calculation unit 133 in the step S12, similarly to the processing in the step S5 (step S13).

In the example illustrated in FIGS. 9B and 11A, there is true dependence caused by the variables a0_i1, a1_i1 and a2_i1.

According to the set of equality expressions E58 illustrated in FIG. 10B, the true dependence-causing variables "a2_i1" and "a1_i1" are respectively equivalent to variables "a[i+4]" and "a[i+3]". The variables "a[i+4]" and "a[i+3]" are neither the dependence-causing variables specified in the steps S2 and S10 nor the variables introduced to remove the name dependence in the steps S3 and S7.

Accordingly, the representations of the variables "a2_i1" and "a1_i1" can be respectively replaced with the representations of the variables "a[i+4]" and "a[i+3]".

Also, according to the set of equality expressions E58, the true dependence-causing variable "a0_i1" is equivalent to the variables "a1_i" and "a2". The variables "a1_i" and "a2", however, are respectively the variable introduced to remove the name dependence in the step S3 and the dependence-causing variable specified in the step S2. Accordingly, the representation of the true dependence-causing variable "a0_i1" cannot be replaced with the representations of these variables. The specification unit 140 therefore judges that all true dependence cannot be removed (step S13: NO).

In this example, the specification unit 140 increments the value of m by one to "3" (step S14), and notifies the calculation unit 130 of the value of m to instruct the calculation unit 130 to perform processing because the value of m is smaller than the value obtained by subtracting the kmin ("0" in this example) from the kmax ("99" in this example) (step S8: YES). The calculation unit 130 having been instructed to perform processing performs the processing in the steps S9, S10, S11 and S12, similarly to the above.

FIG. 12A illustrates the iteration i+3 from which the name dependence has been removed. FIG. 12B illustrates calculation results of equivalence relations between representations of variables with respect to statements in the iteration i+3 from which the name dependence has been removed.

In the example illustrated in FIGS. 11A and 12A, there is true dependence caused by the variables a0_i2, a1_i2 and a2_i2.

According to the set of equality expressions E68 illustrated in FIG. 11B, the true dependence-causing variables "a2_i2", "a1_i2" and "a0_i2" are respectively equivalent to variables "a[i+5]", "a[i+4]" and "a[i+3]". The variables "a[i+5]", "a[i+4]" and "a[i+3]" are neither the dependence-causing variables specified in the steps S2 and S10 nor the variables introduced to remove the name dependence in the steps S3 and S7.

Accordingly, the representations of the variables "a2_i2", "a1_i2" and "a0_i2" can be respectively replaced with the representations of the variables "a[i+5]", "a[i+4]" and "a[i+3]".

The specification unit 140 therefore judges that all true dependence can be removed (step S13: YES). The generation unit 150 generates the candidate modified iteration based on the iteration i+m ("i+3" in this example) from which all true dependence has been removed (step S15).

FIG. 13A illustrates the iteration i+3 from which all true dependence has been removed.

In the example illustrated in FIG. 13A, the generation unit 150 generates the candidate modified iteration by setting the value "i+3" to "k" and respectively replacing variables "a0_i3", "a1_i3" and "a2_i3" with variables "a0_k", "a1_k" and "a2_k".

FIG. 13B illustrates the candidate modified iteration generated by the generation unit 150.

The candidate modified iteration is applicable to iterations kmin+m ("3" in this example) to kmax ("99" in this example). That is to say, when at least 3≤k<kmax is satisfied, the block B1 of the loop R1 illustrated in FIG. 2A can be replaced with an equivalent block having no dependence between iterations.

The specification unit 140 then notifies the calculation unit 130 of the values of kmin ("0" in this example) and m−1 ("2"

in this example) to instruct the calculation unit 130 to perform processing. The iteration expansion unit 131 included in the calculation unit 130 having been instructed to perform processing expands the iterations with respect to kmin to m−1, similarly to the processing in the step S1 (step S16 in FIG. 7).

Also, the name dependence removal unit 132 specifies the dependence between statements in the iterations kmin to m−1, similarly to the processing in the step S2 (step S17 in FIG. 7), and removes the name dependence, similarly to the processing in the step S3 (step S18).

Iterations I1, I2 and I3 illustrated in FIG. 14A are respectively the iterations 0, 1 and 2 of the loop R1 illustrated in FIG. 2A.

Also, iterations I10, I20 and I30 illustrated in FIG. 14B are respectively the iterations 0, 1 and 2 illustrated in FIG. 14A from which the name dependence has been removed. The statements ST1, ST2 and ST3 illustrated in FIG. 14B are respectively the statements ST1, ST2 and ST3 immediately before the loop R1 illustrated in FIG. 2A.

The equivalence relation calculation unit 133 calculates equivalence relations between representations of variables with respect to statements in the iterations kmin to m−1 from which the name dependence has been removed, similarly to the processing in the step S4 (step S19).

FIG. 15 illustrates calculation results of equivalence relations between representations of variables with respect to the statements ST1, ST2 and ST3 illustrated in FIG. 14B, and statements in the iterations 0 and 1 also illustrated in FIG. 14B from which the name dependence has been removed.

FIG. 16 illustrates calculation results of equivalence relations between representations of variables with respect to statements in the iteration 2 illustrated in FIG. 14B from which the name dependence has been removed.

The specification unit 140 then judges whether or not all true dependence can be removed based on the equivalence relations between representations of variables calculated by the equivalence relation calculation unit 133 in the step S19, similarly to the processing in the step S5 (step S20).

According to the set of equality expressions E3 illustrated in FIG. 15, the true dependence-causing variables "a0", "a1" and "a2" are respectively equivalent to variables "a[0]", "a[1]" and "a[2]". The variables "a[0]", "a[1]" and "a[2]" are neither the dependence-causing variables specified in the step S17 nor the variables introduced to remove the name dependence in the step S18.

Accordingly, the representations of the variables "a0", "a1" and "a2" in the statement ST15 illustrated in FIG. 14B can be respectively replaced with the representations of the variables "a[0]", "a[1]" and "a[2]".

Similarly, the representation of the variable "a1" in the statement ST16 illustrated in FIG. 14B can be replaced with the representation of the variable "a[1]", based on the set of equality expressions E15 illustrated in FIG. 15. Also, the representation of the variable "a2" in the statement ST17 illustrated in FIG. 14B can be replaced with the representation of the variable "a[2]", based on the set of equality expressions E16 illustrated in FIG. 15.

Similarly, the representations of the variables "a0_0", "a1_0" and "a2_0" in the statements ST25, ST26 and ST27 illustrated in FIG. 14B can be replaced, based on the sets of equality expressions E18, E25 and E26 illustrated in FIG. 15. Also, the representations of the variables "a0_1", "a1_1" and "a2_1" in the statements ST35, ST36 and ST37 can be replaced, based on the set of equality expressions E28 illustrated in FIG. 15 and the sets of equality expressions E35 and E36 illustrated in FIG. 16.

The specification unit 140 therefore judges that all true dependence can be removed (step S20: YES), and further judges whether or not the iterations kmin ("0" in this example) to m−1 ("2" in this example) from which all true dependence has been removed are the same as the iterations kmin to m−1 applied to the candidate modified iteration generated in the step S15 (step S21).

Iterations I11, I21 and I31 illustrated in FIG. 17A are respectively iterations obtained by removing the true dependence from the iterations 0, 1 and 2 (I10, I20 and I30) illustrated in FIG. 14B from which the name dependence has been removed.

The iterations 0, 1 and 2 applied to the candidate modified iteration illustrated in FIG. 13B are respectively the same as the iterations I11, I21 and I31 illustrated in FIG. 17A. In this example, the specification unit 140 therefore judges that they are the same (step S21: YES). The generation unit 150 generates the assembler program 12 by optimizing and parallelizing a program that is obtained by replacing the block B1 of the loop R1 included in the source program 11 with the candidate modified iteration (step S22).

FIG. 17B illustrates a partial program P2 obtained by replacing the block B1 of the partial program P1 illustrated in FIG. 2A with the candidate modified iteration illustrated in FIG. 13B.

In the partial program P2, the variables "a0", "a1" and "a2" respectively defined in the statements ST1, ST2 and ST3, and the variables "a0_k", "a1_k" and "a2_k" respectively defined in the statements ST92, ST93 and ST94 are not referenced by the statements in the partial program P2. Therefore, on the condition that these variables are not referenced by a part other than the partial program P2 of the source program 11, it is possible to generate an optimized partial program P3 (see FIG. 18) by removing the statements ST1, ST2 and ST3, a statement ST4 that declares the variables "a0", "a1" and "a2", and the statements ST92, ST93 and ST94.

The generation unit 150 also generates a partial program P4 (see FIG. 2B) by parallelizing the partial program P3. The generation unit 150 also stores, in the storage device 10, the assembler program 12 generated based on a source program including the partial program P4, and the program generation apparatus 100 terminates the program generation processing.

Note that an instruction for the parallelization in the partial program P4 illustrated in FIG. 2B is written according to a writing format of OpenMP.

<<Supplement>>

Although having been described based on the above embodiment, the program generation apparatus pertaining to the present invention may be modified as shown below, and it is obvious that the present invention is not limited to the program generation apparatus described in the above embodiment.

(1) The program generation apparatus 100 pertaining to the embodiment is described by taking, as an example, a case where the assembler program 12 is generated from the source program 11 including the loop and having the true dependence between iterations having consecutive iteration numbers. The assembler program 12, however, may be generated from the source program 11 including a loop (e.g. a loop R5 illustrated in FIG. 19A and a loop R7 illustrated in FIG. 19C) and having the true dependence between iterations having inconsecutive iteration numbers. FIG. 19B illustrates a loop R6 that is equivalent to the loop R5 and is included in the source program 11 having no true dependence. FIG. 19D illustrates a loop R8 that is equivalent to the loop R7 and is included in the source program 11 having no true dependence.

To this end, when there is no true dependence as a result of the specification of the dependence in the step S2 in FIG. 5, processing to specify two iterations between which there is the true dependence is performed.

That is to say, the iteration is expanded with respect to s (i+2≤s<N) to specify the dependence between statements in the iteration i and the iteration s. When there is no true dependence, the value of s is incremented by one and the above-mentioned iteration expansion and specification of the dependence are repeated. When there is the true dependence, the processing in the steps S3 and S4 is performed by replacing the iteration i+1 in the steps S3 and S4 with the iteration s.

In addition, the value of m in the step S6 is changed so as to be set to "s", and the value of m in the step S7 in FIG. 6 is changed so as to be set to "s+1". The processing in the step S8 onward is performed in a similar manner to the manner described in the embodiment.

As described above, the program generation apparatus pertaining to the present modification can generates, by referencing a source program including the loop such as the loop R5 illustrated in FIG. 19A and the loop R7 illustrated in FIG. 19C, an assembler program similar to the assembler program that a conventional compiler can generate by referencing a source program including the loop such as the loop R6 illustrated in FIG. 19B and the loop R8 illustrated in FIG. 19D.

(2) The program generation apparatus 100 pertaining to the embodiment terminates the program generation processing without generating the assembler program 12 when the iterations kmin to m−1 from which all true dependence has been removed in the step S21 in FIG. 7 are not the same as the iterations kmin to m−1 applied to the candidate modified iteration generated in the step S15 in FIG. 6 (step S21: NO). The program generation apparatus 100, however, may divide the loop into a partial loop X in which the loop control variable k is kmin to m−1 and a partial loop Y in which the loop control variable k is m to kmax to generate the assembler program 12 configured to be executed by a plurality of processors to execute the partial loop Y in parallel.

(3) The program generation apparatus 100 pertaining to the embodiment generates the assembler program 12 by referencing the source program 11. The program generation apparatus, however, may be modified to include the assembler 210 and the linker 220, and the program generation apparatus pertaining to the present modification may generate the object program 14 by referencing the source program 11.

The linker 220 pertaining to the embodiment links a necessary library and the like with the relocatable binary program 13 in which a location of an address and the like of unresolved data are determined. The linker 220, however, may naturally link a plurality of relocatable binary programs 13 with one another.

(4) The equivalence relation calculation unit 133 in the calculation unit 130 included in the program generation apparatus 100 pertaining to the embodiment calculates the equivalence relations between representations of variables using a method similar to the method disclosed in Patent Literature 2. This is just one example of the calculation of the equivalence relations between representations of variables, and the equivalence relations between representations of variables may be calculated using another method.

For example, the equivalence relations between representations of variables may be calculated using a method of repeatedly replacing representations of statements by utilizing the relation that the same value is stored in values x and y in a statement "x=y", i.e., x and y are equivalent (hereinafter, the method is referred to as "copy propagation").

The method is briefly discussed below.

For example, by performing the copy propagation with respect to the statement ST44 "a2=a[i+3]" in the iteration i illustrated in FIG. 8A, the representations of the statements ST51 and ST53 in the iteration i+1 illustrated in FIG. 8B are respectively replaced with representations of the statements "b[i+1]=a0+a1+a[i+3]" and "a1=a[i+3]".

Furthermore, by performing the copy propagation with respect to the statement ST53 after the replacement and the statement ST54, a representation of a statement ST61 in the iteration i+2 illustrated in FIG. 20A is replaced with a representation "b[i+2]=a0+a[i+3]+a[i+4]". Also, representations of statements ST62 and ST63 are respectively replaced with representations "a0=a[i+3]" and "a1=a[i+4]".

Furthermore, by performing the copy propagation with respect to the statements ST62 and ST63 after the replacement and a statement ST64, representations of statements ST71, ST72 and ST73 in the iteration i+3 illustrated in FIG. 20B are respectively replaced with representations "b[i+3]=a[i+3]+a[i+4]+a[i+5]", "a0=a[i+4]" and "a1=a[i+5]" (see FIG. 20C).

(5) A program for causing a processor to perform the program generation processing described in the embodiment (see FIGS. 5, 6 and 7) may be recorded on a recording medium or distributed via various communication channels. Examples of the recording medium are an IC card, an optical disc, a flexible disk, a ROM and a flash memory. The distributed program is stored in a memory and the like capable of being read by the processor included in an apparatus and is provided for use. By the processor executing the program, various functions of the program generation apparatus described in the embodiment are achieved.

(6) Part or all of the above modifications (1) to (5) may be combined and applied to the program generation apparatus 100 in the embodiment.

(7) The following describes a configuration and modifications of the program generation apparatus pertaining to one embodiment of the present invention, along with their effects.

(a) A program generation apparatus pertaining to one embodiment of the present invention is a program generation apparatus for generating a program by referencing a source program including a loop for executing a block composed of one or more statements N times (N≥2), the source program having such dependence that a variable defined in a statement in the block pertaining to $i^{th}$ execution (1≤i<N) is referenced by a statement in the block pertaining to $j^{th}$ execution (i<j≤N), the program generation apparatus comprising: a calculation unit configured to calculate equivalence relations between representations of variables included in the block pertaining to the $i^{th}$ execution and the block pertaining to any other execution than the $i^{th}$ execution; a specification unit configured to specify, with respect to each of representations of any target variable causing the dependence among the variables, a representation of a variable not causing the dependence that is equivalent to the representation of the target variable among the variables, based on the equivalence relations calculated by the calculation unit; and a generation unit configured to generate a program so that the generated program is for executing the block M times (M≤N) and includes a statement including the representation of the variable specified by the specification unit.

According to the program generation apparatus pertaining to one embodiment of the present invention having the above configuration, by referencing the source program including the loop and having so-called true dependence between the statement in the block pertaining to the $i^{th}$ execution and the statement in the block pertaining to the $j^{th}$ execution, it is possible to generate the program being for executing the block M times and including the statement that includes, in place of each of the representations of the target variable causing the true dependence, the representation of the variable not causing the true dependence that is equivalent to the representation of the target variable.

The generated program can be independently executed in parallel by a plurality of processors to execute processing corresponding to processing of executing the block M times, and thus the predetermined processing to be realized by the loop is executed at high speed.

Accordingly, the program generation apparatus is useful in generating, by referencing the source program including the loop and having the true dependence, the program to be executed by a plurality of processors to execute the predetermined processing to be realized by the loop at high speed.

(b) Also, the representation of the variable specified by the specification unit may be different from any of the representations of the target variable.

According to the program generation apparatus having the above configuration, by referencing the source program including the loop and having the true dependence, it is possible to generate the program being for executing the block M times and including the statement that includes the representation of the variable not causing the true dependence that is equivalent to the representation of the target variable.

That is to say, the program generation apparatus generates, by referencing the source program including the loop and having the true dependence, the program to be independently executed in parallel by a plurality of processors to execute the processing corresponding to the processing of executing the block M times at high speed.

(c) Also, the block pertaining to the any other execution than the $i^{th}$ execution may be the block pertaining to $(i+1)^{th}$ execution, and until the specification unit specifies the representation of the variable not causing the dependence that is equivalent to the representation of the target variable, the calculation unit may repeatedly increment the value of i by one and calculate the equivalence relations.

According to the program generation apparatus having the above configuration, when the representation of the variable not causing the true dependence that is equivalent to the representation of the target variable causing the true dependence is specified in the case where the value of i is n (n<N), it is possible to generate the program being for executing the block N−n times at least from n to N and including the statement that includes the representation of the variable not causing the true dependence that is equivalent to the representation of the target variable causing the true dependence.

Accordingly, it becomes possible to execute the predetermined processing to be realized by the loop at high speed by a plurality of processors independently executing processing corresponding to processing of executing the block at least N−n times in parallel.

(d) Also, the source program may be a program to be executed by a single processor, and the program generated by the generation unit may be a program to be executed in parallel by a plurality of processors.

According to the program generation apparatus having the above configuration, by referencing the program to be executed by the single processor, it is possible to generate the program to be independently executed in parallel by the plurality of processors. Therefore, for example, when there has been a program that is created by a programmer and is to be executed by the single processor, it is unnecessary to regenerate the program to be executed in parallel by the plurality of processors. Accordingly, it is possible to save the trouble of creating the program.

(e) Also, when M<N is satisfied, the generation unit may modify the generated program so that the program after modification is for executing the block N−M times in addition to the M times, and judge whether processing of the program after the modification is equivalent to processing of the source program, and when judging affirmatively, the generation unit may replace the program before the modification with the program after the modification.

According to the program generation apparatus having the above configuration, on the condition that, even when the generated program for executing the block M times (M<N) is modified so as to be the program for executing the block N times, the processing of the program after the modification is equivalent to the processing of the source program, the program for executing the block N times is eventually generated.

The program for executing the block N times is the program including the statement that includes the representation of the variable not causing the true dependence that is equivalent to the representation of the target variable causing the true dependence. Accordingly, it becomes possible to execute the predetermined processing to be realized by the loop at high speed by the plurality of processors independently executing processing corresponding to processing of executing the block N times in parallel.

INDUSTRIAL APPLICABILITY

The program generation apparatus of the present invention is used to generate, by referencing the source program including the loop and having the so-called true dependence, a new program to be shared and executed in parallel by a plurality of processors to execute predetermined processing to be realized by the loop.

REFERENCE SIGNS LIST 10 storage device
11 source program
12 assembler program
13 relocatable binary program
14 object program
100 program generation apparatus
110 storage unit
120 acquisition unit
130 calculation unit
131 iteration expansion unit
132 name dependence removal unit
133 equivalence relation calculation unit
140 specification unit
150 generation unit
210 assembler
220 linker
1000 compiler system

The invention claimed is:

1. A program generation apparatus for generating a program by referencing a source program including a loop for executing a block comprising one or more statements N times (N≥2), the source program having such dependence that a variable defined in a statement in the block pertaining to an $i^{th}$ execution (1≤i<N) is referenced by a statement in the block pertaining to a $j^{th}$ execution (i<j≤N), the program generation apparatus comprising:

a loop expansion unit configured to expand the loop to generate statements in the block;

a name dependence removal unit configured to remove name dependencies between consecutive iterations expanded by the loop expansion unit;

a calculation unit configured to generate an equality expression set that is a set of equivalent relation information pieces each indicating equivalent variables or expressions included in each of the statements, wherein equivalent relation information pieces are calculated between representations of variables with respect to statements in consecutive iterations from which name dependence has been removed by the name dependence removal unit;

a specification unit configured to, when a representation of a variable used in an operation target of a statement in the block pertaining to the $j^{th}$ execution is identical to a representation of a variable showing an operation result of a statement in the block pertaining to the $i^{th}$ execution, specify a variable that is equivalent to the variable showing the operation result and is not used as any variable showing an operation result in the block pertaining to the $i^{th}$ execution based on the equivalent relation information pieces; and a generation unit operable to generate a program that is for executing the block M times (M≤N) and includes a modified statement in which the representation of the variable used in the operation target of the statement in the block pertaining to the $j^{th}$ execution is replaced by a representation of the variable specified by the specification unit to create the modified statement from a previous statement, such that the generated program does not have the dependence.

2. The program generation apparatus of claim 1, wherein a representation of the variable specified by the specification unit is different from any representation of the variable used in the operation target of the statement in the block pertaining to the $j^{th}$ execution.

3. The program generation apparatus of claim 2, wherein until the specification unit specifies the representation of the variable not causing the dependence that is equivalent to the representation of the variable used in the operation target of the statement in the block pertaining to the $j^{th}$ execution, the calculation unit repeatedly increments the value of i by one and generates the equality expression set.

4. The program generation apparatus of claim 2, wherein the source program is to be executed by a single processor, and
the program generated by the generation unit is to be executed in parallel by a plurality of processors.

5. The program generation apparatus of claim 2, wherein when M<N is satisfied, the generation unit modifies the generated program so that the program after the modification is for executing the block N−M times in addition to the M times, and judges whether processing of the program after the modification is equivalent to processing of the source program, and
when judging affirmatively, the generation unit replaces the program before the modification with the program after the modification.

6. A program generation method used in a program generation apparatus for generating a program by referencing a source program including a loop for executing a block comprising one or more statements N times (N≥2), the source program having such dependence that a variable defined in a statement in the block pertaining to an $i^{th}$ execution (1≤i<N) is referenced by a statement in the block pertaining to a $j^{th}$ execution (i<j≤N), the program generation apparatus including a calculation unit, a specification unit and a generation unit, the program generation method comprising the steps of:

expanding the loop to generate statements in the block;

removing name dependencies between consecutive iterations expanded by the expanding of the loop;

generating, using the calculation unit, an equality expression set that is a set of equivalent relation information pieces each indicating equivalent variables or expressions included in each of the statements, wherein equivalent relation information pieces are calculated between representations of variables with respect to statements in consecutive iterations from which name dependence has been removed;

specifying, using the specification unit, when a representation of a variable used in an operation target of a statement in the block pertaining to the $j^{th}$ execution is identical to a representation of a variable showing an operation result of a statement in the block pertaining to the $i^{th}$ execution, a variable that is equivalent to the variable showing the operation result and is not used as any variable showing an operation result in the block pertaining to the $i^{th}$ execution based on the equivalent relation information pieces; and generating, using the generation unit, a program that is for executing the block M times (M≤N) and includes a modified statement in which the representation of the variable used in the operation target of the statement in the block pertaining to the $j^{th}$ execution is replaced by a representation of the variable specified by said specifying of the variable to create the modified statement from a previous statement, such that the generated program does not have the dependence.

7. A non-transitory computer-readable recording medium having a program recorded thereon, the program for causing a processor in a program generation apparatus to perform a program generation processing method, the program generation apparatus being for generating a program by referencing a source program including a loop for executing a block comprising one or more statements N times (N≥2), the source program having such dependence that a variable defined in a statement in the block pertaining to an $i^{th}$ execution (1≤i<N) is referenced by a statement in the block pertaining to a $j^{th}$ execution (i<j≤N), the program generation processing method comprising the steps of:

expanding the loop to generate statements in the block;

removing name dependencies between consecutive iterations expanded by the expanding of the loop;

generating an equality expression set that is a set of equivalent relation information pieces each indicating equivalent variables or expressions included in each of the statements, wherein equivalent relation information pieces are calculated between representations of variables with respect to statements in consecutive iterations from which name dependence has been removed;

specifying, when a representation of a variable used in an operation target of a statement in the block pertaining to the $j^{th}$ execution is identical to a representation of a variable showing an operation result of a statement in the block pertaining to the $i^{th}$ execution, a variable that is equivalent to the variable showing the operation result and is not used as any variable showing an operation result in the block pertaining to the $i^{th}$ execution based on the equivalent relation information pieces; and generating a program that is for executing the block M times (M≤N) and includes a modified statement in which the representation of the variable used in the operation target of the statement in the block pertaining to the $j^{th}$ execution is replaced by a representation of the variable specified by said specifying of the variable to create the modified statement from a previous statement, such that the generated program does not have the dependence.

* * * * *